Oct. 9, 1928.
L. G. LAUN
GRAVY PERCOLATOR
Filed March 9, 1928
1,687,099
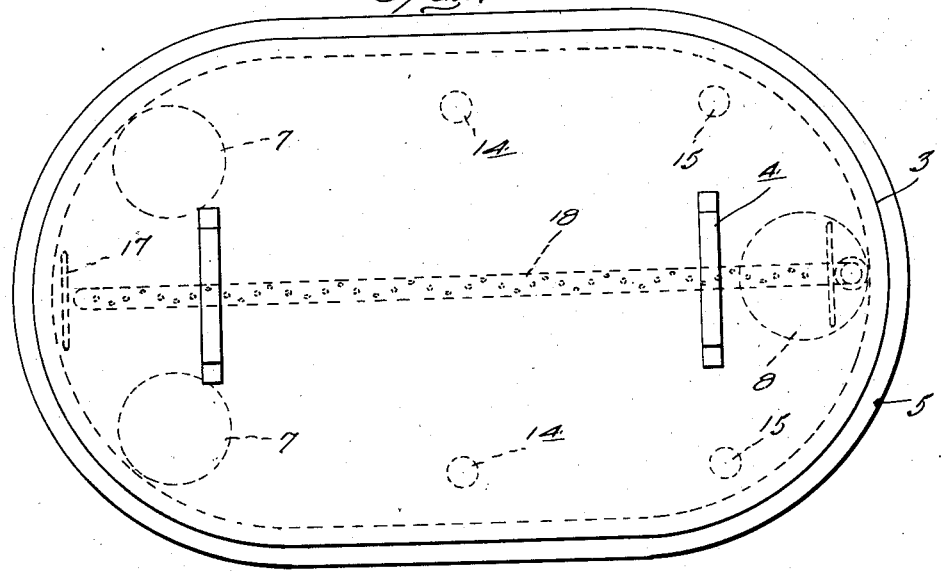
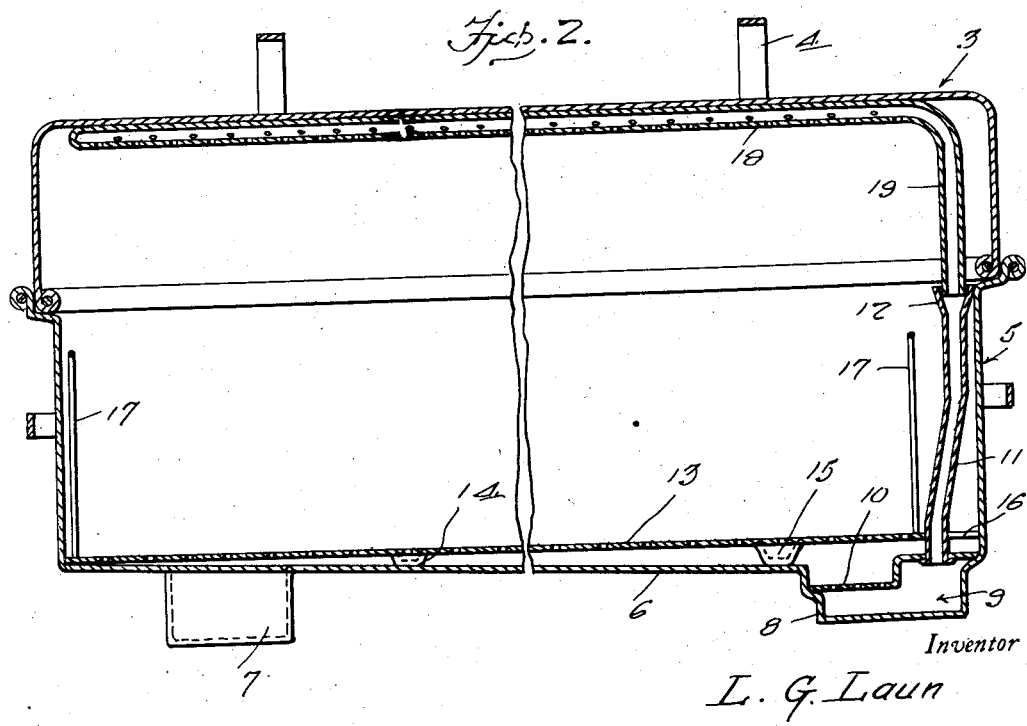
Inventor
L. G. Laun
By Clarence A. O'Brien
Attorney Patented Oct. 9, 1928.

1,687,099

UNITED STATES PATENT OFFICE.

LOUIS G. LAUN, OF UTICA, NEW YORK.

GRAVY PERCOLATOR.

Application filed March 9, 1928. Serial No. 260,301.

The present invention relates to a device which may be conveniently referred to as a gravy percolator, the same being adapted for use in association with a cooking boiler.

The purpose of this invention is to provide a means for collecting the gravy and juices in the bottom of the pan to permit them to be elevated under the action of the heat, through a conduit which includes a perforated manifold through which it may percolate, and drop downwardly by gravity in the boiler to continually baste meat while in the process of cooking.

The particular structural details and their relationship constituting the novelty of the improved structure will become more readily apparent from the following description and drawings.

In the drawings:

Figure 1 is a top plan view of a boiler, constructed in accordance with the present invention.

Figure 2 is a vertical longitudinal section through the same showing the precise arrangement of details forming the novelty.

In carrying out the invention, I provide a boiler comprising a removable top 3, having a handle 4, and fitting telescopically down in an offset rim portion of the bottom section or body 5. The body in this instance is formed with an inclined solid bottom wall 6, having a pair of hollow supporting legs 7 at one end and a single centrally located hollow leg 8 at the opposite end. The leg 8 has the additional function of forming a grease and gravy collecting receptacle 9.

This leg is so formed as to provide a supporting ledge for a disc like apertured plate 10, carrying an upstanding tube 11, forming a part of the circulation conduit. The upper end of the tube is flared outwardly as at 12 to terminate just below the top of the body 5. Removably arranged within the body is a false bottom 13, formed with a multiplicity of apertures, as shown, and provided with depressions providing supporting feet 14, and 15, respectively. The feet are distinguished in this manner because they are of different heights to dispose the false bottom in a substantially horizontal plane. One end of the bottom is formed with a notch 16 which embraces the lower end portion of the tube 11. This insert or false bottom has appropriate lifting bails 17. The remaining part of the conduit is in the form of a horizontal manifold 18 fastened to the central part of the underside of the cover 3 and formed with a multiplicity of distributing holes, through which the gravy is permitted to circulate or gravitate downwardly. The manifold has a depending branch 19 at one end which fits telescopically into the flared end 12 of the tube 11.

In operation, it is obvious that the gravy and juices pass through the openings in the false bottom 13 and collect upon the main bottom 6, where they flow downwardly by the action of gravity into the collecting receptacle 9. When heated sufficiently they rise in a well-known manner through the tube 11, the branch 19 and flow into the manifold 18.

Here they percolate downwardly through the openings in the manifold and drop down onto the contents of the pan which is resting on the false bottom. Thus, the contents are continuously subject to the desired basting.

The construction and arrangement of the parts is quite clear and the advantages will be apparent to persons familiar with structures of this class. Therefore a more lengthy description is regarded unnecessary.

Minor changes in the shape, size and rearrangement of parts coming within the field of invention claimed may be resorted to, if desired.

I claim:

1. In a structure of the class described, a hollow body provided wth supporting feet, provided with an inclined bottom, and a collecting gravy and juice receptacle at one end of the bottom, an apertured false bottom resting on the inclined bottom and located within the body, a sectional removable cover, and a gravy conducting conduit arranged within the boiler and communicating at one end with said receptacle, one section being carried by said cover and the other section being mounted upon said body.

2. In a structure of the class described, a hollow body provided with supporting feet, provided with an inclined bottom, and a collecting receptacle at one end of the bottom, an apertured false bottom resting on the inclined bottom and located within the body, a removable cover, and a gravy conducting conduit arranged within the boiler and communicating at one end with said receptacle, said conduit comprising a vertically disposed tube communicating at its lower end with a receptacle and terminating at its upper end adjacent the top of said body, and an apertured manifold having a horizontal portion fastened to the under central portion of the cover and provided with a downturned branch telescopically connected to said tube.

3. In a structure of the class described, a hollow pan like body having an inclined bottom provided at one end with a hollow supporting leg having the additional function of a gravy collecting receptacle, an apertured plate disposed in said receptacle and having an upstanding tube located adjacent one of the end walls of the body, said tube having its upper end flared, a false bottom arranged in said body and resting on said main bottom and provided with a multiplicity of apertures, a cover carried by said body, a horizontal apertured manifold on the inside of the cover including a depending branch telescopically connected with the flared upper end of said tube.

In testimony whereof I affix my signature.

LOUIS G. LAUN.